Aug. 28, 1928.  
H. C. SAUNDERS  
FIRE HYDRANT COUPLING  
Filed July 13, 1926

1,682,187

Henry C. Saunders  
Inventor

By C. A. Snow & Co.  
Attorneys.

Patented Aug. 28, 1928.

1,682,187

UNITED STATES PATENT OFFICE.

HENRY C. SAUNDERS, OF ONTARIO, CALIFORNIA.

FIRE-HYDRANT COUPLING.

Application filed July 13, 1926. Serial No. 122,201.

This invention relates to hose couplings, and aims to provide a strong and durable coupling which may be quickly assembled and disassembled, thereby adapting the device for use more particularly as a fire hose coupling.

An important object of the invention is to provide a coupling of this character having offset portions defining inclined shoulders so that when cooperating sections are brought together, they will be securely held against accidental separation.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
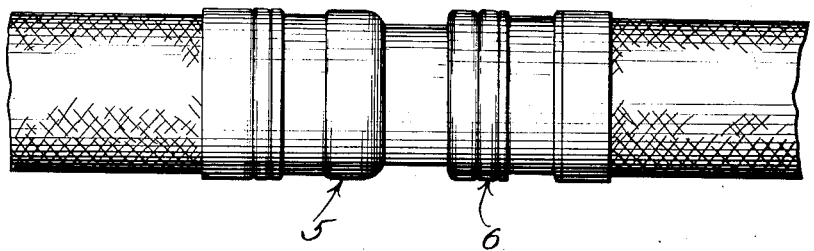
Figure 1 is a side elevational view of a coupling constructed in accordance with the invention.
Figure 2:
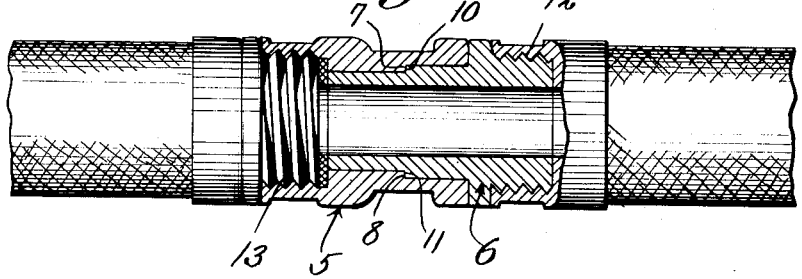
Figure 2 is a longitudinal sectional view through the coupling.
Figure 3:
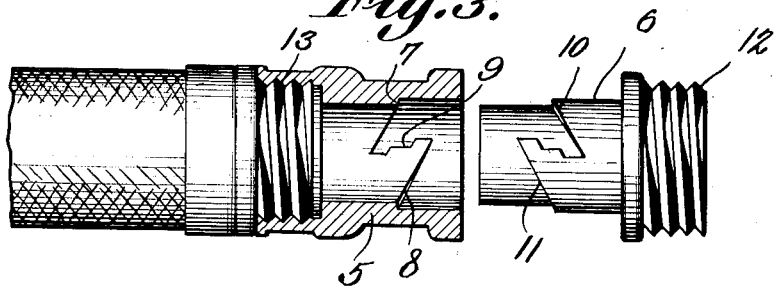
Figure 3 is an elevational view illustrating the female member of the coupling in section.

Referring to the drawing in detail, the coupling includes a female section 5 and a male section 6, the female section being provided with a cut away portion defining shoulders 7 and 8 which are inclined as clearly shown by Figure 3 of the drawing, the shoulders being arranged on opposite sides of the section of which they form a part.

These shoulders 7 and 8 are offset with respect to each other, there being provided shoulders 9 arranged in stepped relation with each other.

The male section is also cut away to provide inclined shoulders 10 and 11, the portions between the shoulders 10 and 11 being cut away to provide a step-like structure to cooperate with the shoulders 9 of the adjacent section when the sections of the coupling are brought together and slightly rotated with respect to each other.

Thus it will be seen that due to this construction, the sections of the coupling may be securely locked and held in their locked positions by merely inserting the male member in the female member and slightly twisting or rotating the sections with respect to each other.

It will also be seen that by slightly rotating these sections of the coupling in the opposite direction, the shoulders will become disengaged and the sections may be readily disconnected.

The sections are provided with threaded portions 12 and 13 respectively which cooperate with suitable fixtures of hose sections for securing the hose sections to the coupling.

I claim:—

A hose coupling embodying cooperating tubular sections, one of the sections having its inner surface cut away defining inclined shoulders spaced from the outer end thereof, step-like shoulders connecting the lower ends of the inclined shoulders and the upper edges of the inclined shoulders, the outer surface of the opposite section being cut away defining inclined shoulders, step-like shoulders connecting the outer edge of one inclined shoulder with the inner edge of the opposite inclined shoulder, and the shoulders of the sections adapted to interlock to hold the sections together.

In testimony that I claim the foregoing as my own, I have hereto affixed my signature.

HENRY C. SAUNDERS.